US010391965B2

(12) United States Patent
Spahn et al.

(10) Patent No.: US 10,391,965 B2
(45) Date of Patent: Aug. 27, 2019

(54) TUBULAR SEAT BELT SYSTEM HAVING AIR DELIVERY

(71) Applicant: Ford Global Technologies, LLC, Dearborn, MI (US)

(72) Inventors: Brian Robert Spahn, Plymouth, MI (US); Benjamin Yilma, Canton, MI (US); Jeffrey Tien Vo, Southfield, MI (US); Edward Joseph DeSmet, Jr., Canton, MI (US); Travis Justin Raines, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/653,602

(22) Filed: Jul. 19, 2017

(65) Prior Publication Data

US 2019/0023212 A1 Jan. 24, 2019

(51) Int. Cl.
*B60R 21/18* (2006.01)
*B60R 21/239* (2006.01)
*B60R 22/28* (2006.01)
*B60R 21/268* (2011.01)
*B60R 21/276* (2006.01)
(Continued)

(52) U.S. Cl.
CPC ............ *B60R 21/18* (2013.01); *B60R 21/239* (2013.01); *B60R 21/268* (2013.01); *B60R 21/276* (2013.01); *B60R 22/023* (2013.01); *B60R 22/28* (2013.01); *B60R 22/26* (2013.01); *B60R 2022/282* (2013.01)

(58) Field of Classification Search
CPC ..... B60R 21/18; B60R 21/276; B60R 21/239; B60R 2021/2395; B60R 22/28; B60R 2022/282; B60R 2022/288
See application file for complete search history.

(56) References Cited

U.S. PATENT DOCUMENTS 3,306,662 A    2/1967  Finnigan
3,801,156 A *  4/1974  Granig .................... B60R 21/18
                                                        280/733
(Continued)

FOREIGN PATENT DOCUMENTS

AT            300591      7/1972
DE     102008034633 A1    1/2010
(Continued)

OTHER PUBLICATIONS

U.S. Statutory Invention Registration No. H902, published Apr. 2, 1991, to Rousseau.
(Continued)

*Primary Examiner* — Barry Gooden, Jr.
(74) *Attorney, Agent, or Firm* — Vichit Chea; Price Heneveld LLP

(57) ABSTRACT

A vehicle seat belt system is provided. The vehicle seat belt system includes a seat belt comprising a tubular seat belt webbing defining a passageway and a plurality of pressure control valves and a seat belt buckle for connecting to the seat belt. The seat belt buckle has an air delivery port for delivering air to the passenger, and an air delivery device supplies air to the seat belt, wherein the valves allow the supplied air to exit the seat belt at a first air pressure and block air from exiting at a second pressure.

20 Claims, 7 Drawing Sheets

(51) Int. Cl.
*B60R 22/02* (2006.01)
*B60R 22/26* (2006.01)

(56) References Cited

U.S. PATENT DOCUMENTS

| | | | |
|---|---|---|---|
| 3,820,814 A * | 6/1974 | Allgaier et al. | B60R 21/239 137/516.27 |
| 3,887,213 A * | 6/1975 | Goetz | B60R 21/231 137/843 |
| 3,905,615 A | 9/1975 | Schulman | |
| 3,975,258 A * | 8/1976 | Fox | B60R 21/18 280/733 |
| 4,370,784 A | 2/1983 | Turnbull | |
| 4,565,991 A | 1/1986 | Lupoli et al. | |
| 5,016,913 A * | 5/1991 | Nakajima | B60R 21/239 280/738 |
| 5,492,363 A * | 2/1996 | Hartmeyer | B60R 21/239 280/738 |
| 5,653,741 A | 8/1997 | Grant | |
| 5,727,814 A | 3/1998 | White | |
| 5,730,121 A | 3/1998 | Hawkins, Jr. et al. | |
| 6,220,626 B1 * | 4/2001 | Utsumi | B60R 21/18 280/733 |
| 6,443,487 B1 | 9/2002 | Suyama | |
| 6,471,243 B1 | 10/2002 | Brown | |
| 6,630,414 B1 | 10/2003 | Matsumoto | |
| 6,737,610 B1 | 5/2004 | Horn et al. | |
| 7,201,024 B2 | 4/2007 | Hirayama et al. | |
| 7,434,833 B2 | 10/2008 | Kore | |
| 7,543,849 B2 * | 6/2009 | Bradburn | B60R 21/239 280/739 |
| 7,770,921 B2 * | 8/2010 | Mueller | B60R 21/207 280/730.2 |
| 7,788,952 B2 | 9/2010 | Morrison | |
| 7,977,608 B2 | 7/2011 | Diemer et al. | |
| 8,269,512 B2 | 9/2012 | Ootaka | |
| 8,876,580 B2 | 11/2014 | Castro | |
| 9,027,961 B2 | 5/2015 | Yamataki | |
| 9,204,493 B2 | 12/2015 | Yoshimoto et al. | |
| 9,346,430 B2 | 5/2016 | Wang et al. | |
| 9,539,983 B2 | 1/2017 | Demeritte | |
| 9,902,358 B2 * | 2/2018 | Okubo | B60R 21/18 |
| 9,981,623 B2 | 5/2018 | Kobata | |
| 10,143,043 B1 * | 11/2018 | Elson | H05B 3/347 |
| 2003/0206834 A1 | 11/2003 | Chiao et al. | |
| 2003/0222446 A1 * | 12/2003 | Soderquist | B60R 21/231 280/743.1 |
| 2004/0140660 A1 * | 7/2004 | Xu | B60R 21/02 280/808 |
| 2004/0262294 A1 | 12/2004 | Horey et al. | |
| 2006/0208471 A1 | 9/2006 | Sundararajan et al. | |
| 2007/0170710 A1 * | 7/2007 | Bouquier | B60R 21/239 280/739 |
| 2009/0301339 A1 * | 12/2009 | Ito | B60R 21/239 102/531 |
| 2011/0282637 A1 | 11/2011 | Yeh | |
| 2012/0055914 A1 | 3/2012 | Goto et al. | |
| 2012/0242115 A1 | 9/2012 | Schreiber | |
| 2013/0026744 A1 * | 1/2013 | Fischer | B60R 21/2338 280/742 |
| 2013/0106083 A1 * | 5/2013 | Burczyk | B60R 21/18 280/733 |
| 2014/0080373 A1 | 3/2014 | Keitsch | |
| 2014/0225354 A1 * | 8/2014 | Williams | B60R 21/239 280/743.1 |
| 2014/0246415 A1 | 9/2014 | Wittkowski | |
| 2015/0054268 A1 * | 2/2015 | Raines | B60R 21/239 280/736 |
| 2016/0303943 A1 | 10/2016 | Arens et al. | |
| 2017/0190310 A1 * | 7/2017 | Okubo | B60R 21/18 |
| 2017/0341621 A1 | 11/2017 | Helvoort et al. | |

FOREIGN PATENT DOCUMENTS

| | | | |
|---|---|---|---|
| FR | 2765834 A1 | 1/1999 | |
| JP | 4331853 B2 | 9/2009 | |
| JP | 2013226882 A | 11/2013 | |
| JP | 2015039901 A | 3/2015 | |
| JP | 2016144980 A | 8/2016 | |
| WO | WO-2015061494 A1 * | 4/2015 | B60R 22/12 |

OTHER PUBLICATIONS

U.S. Appl. No. 15/834,170, filed Dec. 7, 2017, entitled "Vehicle Seat Belt System Having Electrical Connector," (21 pages of specification and 22 pages of drawings) and filing receipt.

U.S. Appl. No. 15/834,191, filed Dec. 7, 2017, entitled "Heated Seat Belt," (21 pages of specification and 22 pages of drawings) and filing receipt.

U.S. Appl. No. 15/834,217, filed Dec. 7, 2017, entitled "Vehicle Seat Belt System Having Uniform Air Delivery," (14 pages of specification and 8 pages of drawings) and filing receipt.

U.S. Appl. No. 15/834,247, filed Dec. 7, 2017, entitled "Vehicle Seat Belt System Having Air Distribution Manifold," (12 pages of specification and 5 pages of drawings) and filing receipt.

U.S. Appl. No. 15/834,266, filed Dec. 7, 2017, entitled "Vehicle Seat Belt Having Tubes for Air Delivery," (14 pages of specification and 6 pages of drawings) and filing receipt.

* cited by examiner

US 10,391,965 B2

TUBULAR SEAT BELT SYSTEM HAVING AIR DELIVERY

FIELD OF THE INVENTION

The present invention generally relates to vehicle seat belts, and more particularly relates to the delivery of air through the seat belt for enhanced seat belt comfort.

BACKGROUND OF THE INVENTION

Automotive vehicles are typically equipped with seat belts for restraining passengers seated in vehicle seats. Conventional seat belts typically include a lap belt and a shoulder belt connected to a buckle which, in turn, connects to the vehicle structure, such as a seat or floor. The seat belt is typically made of a seat belt webbing that contacts the body of the seated passenger. The webbing can buildup thermal energy and cause discomfort for some passengers. It is desirable to provide for a seat belt system that provides enhanced comfort for the seated passenger.

SUMMARY OF THE INVENTION

According to one aspect of the present invention, a vehicle seat belt system is provided. The vehicle seat belt system includes a seat belt comprising a tubular seat belt webbing defining a passageway and a plurality of pressure controlled valves, and an air delivery device supplying air to the seat belt, wherein the valves allow the supplied air to exit openings in the seat belt webbing at a first air pressure and block air from exiting the openings at a second pressure.

Embodiments of the first aspect of the invention can include any one or a combination of the following features:
- each valve includes an opening and a sealable flap for engaging the opening between an open position that allows air to flow through the opening and a closed position that blocks air flow;
- the sealing flap is biased to an open position;
- the seat belt system includes a shoulder belt, wherein the passageway and plurality of pressure control valves are formed in the shoulder belt;
- the seat belt system includes a buckle for connecting with the seat belt webbing, wherein air from the air delivery system enters the webbing through the buckle;
- the seat belt system includes an airbag gas supply operatively coupled to the webbing, wherein the airbag gas supply causes the webbing to expand when activated; and
- the first pressure is less than the second pressure.

According to another aspect of the present invention, a vehicle seat belt system is provided. The vehicle seat belt system includes a seat belt comprising a tubular seat belt webbing defining a passageway and a plurality of pressure controlled valves. The seat belt system also includes a seat belt buckle for connecting with the seat belt, wherein the seat belt buckle forms an air delivery passage for delivering air to the passageway. The seat belt system further includes an air delivery device coupled to the seat belt buckle for supplying air to the seat belt webbing.

Embodiments of the second aspect of the invention can include any one or a combination of the following features:
- the tubular seat belt includes a plurality of pressure controlled valves that allow the supplied air to exit the seat belt at a first air pressure and block air from exiting at a second pressure;
- each valve comprises an opening and a sealable flap for engaging the opening between an open position that allows air to flow through the opening and a closed position that blocks air flow;
- the sealing flap is biased to an open position;
- the seat belt comprises a shoulder belt, wherein the passageway and the plurality of pressure control valves are formed in the shoulder belt;
- the seat belt system includes a tongue connected with the seat belt webbing for releasable connecting with the buckle, wherein air from the air delivery system enters the passageway in the webbing through the buckle and the tongue;
- the seat belt system includes an airbag gas supply operatively coupled to the webbing, wherein the airbag causes the webbing to expand when activated; and
- the first pressure is less than the second pressure.

According to a further aspect of the present invention, a vehicle seat belt system is provided. The vehicle seat belt system includes a seat belt comprising a tubular seat belt webbing defining a passageway and a plurality of openings, and a seat belt buckle and tongue for connecting with the seat belt, wherein the seat belt buckle and tongue forms an air delivery port for delivering air to the passageway. The system also includes an air delivery device supplying air to the seat belt webbing, wherein the valves allow the supplied air to exit the openings via the valves at a first air pressure and block air from exiting the openings at a second pressure.

Embodiments of the third aspect of the invention can include any one or a combination of the following features:
- each valve comprises an opening and a sealable flap for engaging the opening between an open position that allows air to flow through the opening and a closed position that blocks air flow through the opening;
- the sealing flap is biased to an open position;
- the seat belt system includes an airbag gas supply operatively coupled to the webbing, wherein the airbag gas supply causes the webbing to expand when activated; and
- the first pressure is less than the second pressure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
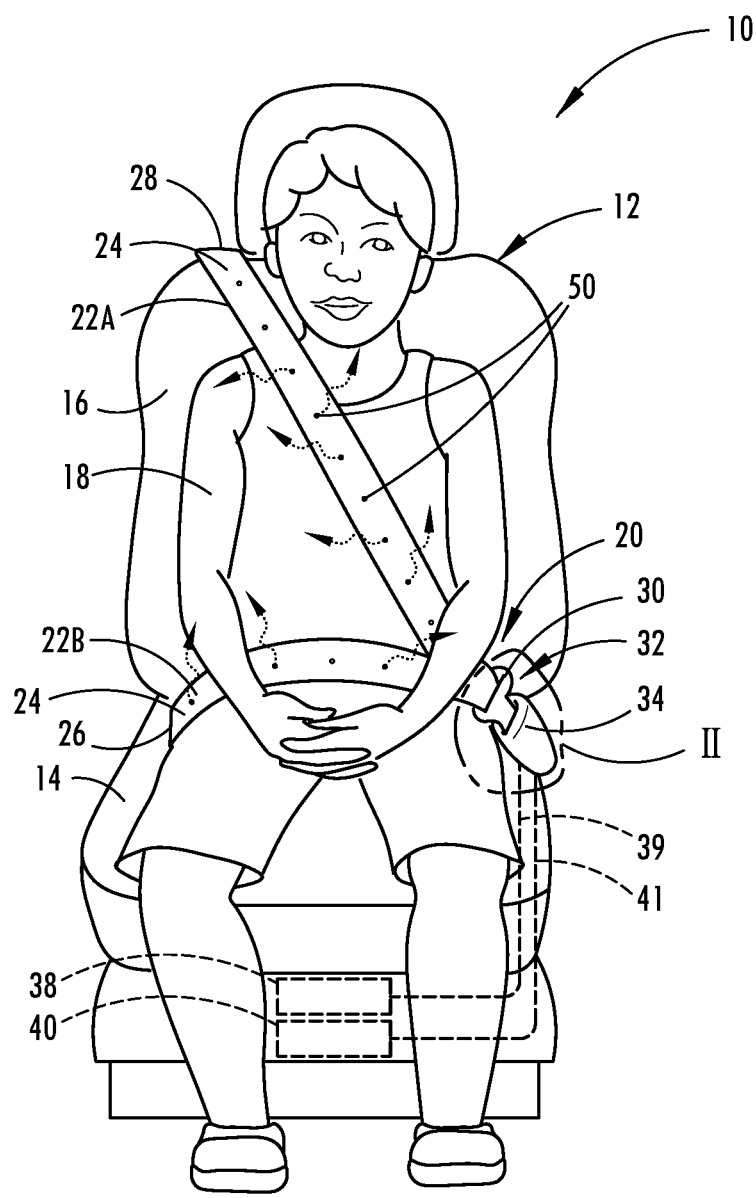
FIG. 1 is a perspective view of the passenger cabin of an automotive vehicle having a seat belt system restraining a person seated on a seat assembly and configured with air delivery, according to one embodiment.

Referring now to FIG. 1, a portion of the passenger cabin or compartment of a vehicle 10 is generally illustrated having a seat belt system 20 assembled onto a seat assembly 12 and including an air delivery arrangement for delivering forced air to a passageway in the seat belt webbing, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger 18. It should be appreciated that the vehicle 10 may include a plurality of seat assemblies 12 each including a seat belt system 20 as shown and described herein.

The seat belt system 20 is shown as a three-point seat belt configuration having a tubular seat belt webbing 24 connected at a first connection end 28 generally near the top of the seat back 16 or another supporting portion within the vehicle such as the B-pillar, a second connection point connected to the floor or the seat 14 of the vehicle generally in the region of the lap of the passenger seated on the seat 14, and a third connection point 30 shown connected to a connector tongue 32 which releasably connects or fastens to a seat belt buckle 34. The connector tongue 32 is matingly and releasably coupled to the seat belt buckle 34 for fastening the tongue 32 onto the buckle 34. The seat belt system 20 includes the seat belt comprising the tubular seat belt webbing 24 defining an interior passageway and a plurality of air exhaust openings 50 formed therein. In the embodiment shown, the seat belt webbing 24 includes a shoulder belt 22A that is generally positioned to extend from the lap over the shoulder and chest of a passenger and a lap belt 22B which is positioned to extend over the lap of the passenger when seated in the seat assembly 12. The lap belt 22B and shoulder belt 22A may be connected to one another or may be separate belts. It should be appreciated that the shoulder belt 22A or the lap belt 22B or both the shoulder belt 22A and lap belt 22B may include the tubular passageway operatively coupled to air delivery and air exhaust openings 50, according to various embodiments.

The vehicle seat belt system 20 also includes an air delivery device 40 for supplying forced air to the seat belt webbing 24. The air delivery device 40 may be located within or below the vehicle seat assembly 12, as shown in FIG. 1, according to one embodiment. It should be appreciated that the air delivery device 40 may be a shared or dedicated air delivery system and may be located elsewhere on the vehicle. The air delivery device 40 may include a heating, ventilation and air conditioning (HVAC) system for delivering heated or cooled air through air ducts. In addition, the air delivery device 40 may deliver air in the form of oxygen, humidified air, or olfactory scented air, which may be delivered into a passageway within the seat belt webbing 24 and output through the exhaust openings 50. The air delivery device 40 delivers the air into a passageway 36 in the seat belt buckle 34 and passes through the connector tongue 32 into the seat belt passageway 38 in the seat belt webbing 24, according to one embodiment.

Figure 2:
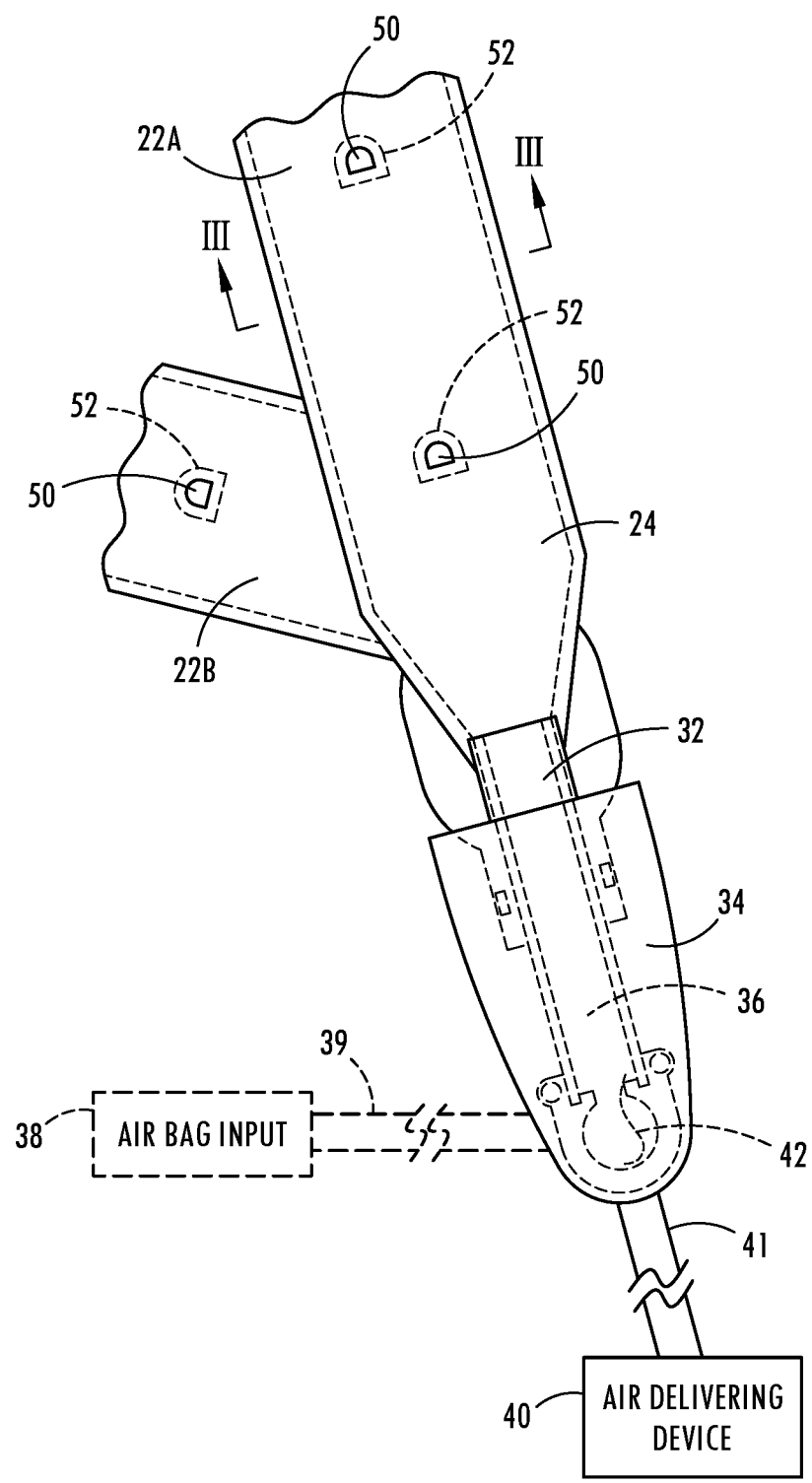
FIG. 2 is an enlarged side view of a portion of the seat assembly illustrating an air delivery system coupled to the seat belt buckle for delivery of air to seat belt webbing.

As seen in FIG. 2, the air delivery device 40 delivers forced air to the air flow passageway 36 within the seat belt buckle 34 and the connecting tongue 32 fastened thereto. The connector tongue 32 and buckle 34 may have cooperating interior chambers that form the air flow passageway 36 similar to those employed in a seat belt airbag system, according to one embodiment. In this embodiment, an airbag gas delivery supply 38, such as a gas canister may deliver gas via a tube 39 to the air passageway 36 in the form of an ignited combustible gas. The seat belt webbing 24 operates as an airbag when the high pressure gas is present in the seat belt webbing 24. The air delivery device 40 may include a fan to force air into the passageway 48 in the seat belt webbing 24. The forced air builds up to a first or second pressure within the passageway 48 due to the closed or partially closed chamber formed by the passageway 48. The air delivery device 40 delivers air via a tube 41 into the air passageway 36 at one of two pressure levels to either blow air onto the occupant at a low first pressure or to expand the seat belt webbing 24 for comfort at a higher second pressure. The gas and air delivery tubes 41 and 42 may be coupled or join together with the air passage 36 which allows forced air to be delivered into the seat belt webbing 24. A pivoting flap valve 42 may be included at the output of tube 41 to prevent airbag gas from entering tube 41 during airbag deployment. The airbag gas is deployed at a third pressure which is greater than the first and second pressures provided by the air delivery device 40. It should be appreciated that the vehicle seat belt system 20 may be employed with or without a seat belt airbag.

Figure 3:
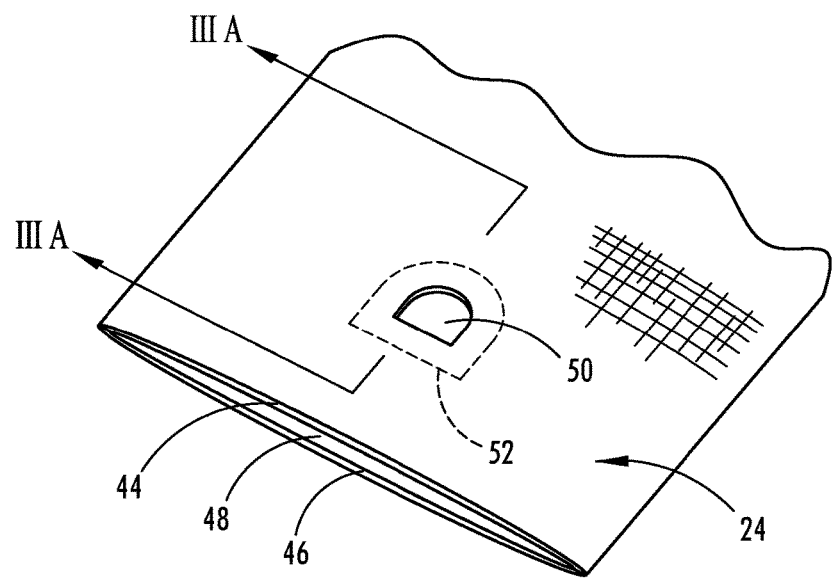
FIG. 3 is an enlarged portion of the seat belt webbing further illustrating a sealing flap forming a valve at an opening for controlling air flow within and exiting the seat belt webbing.
Figure 3A:
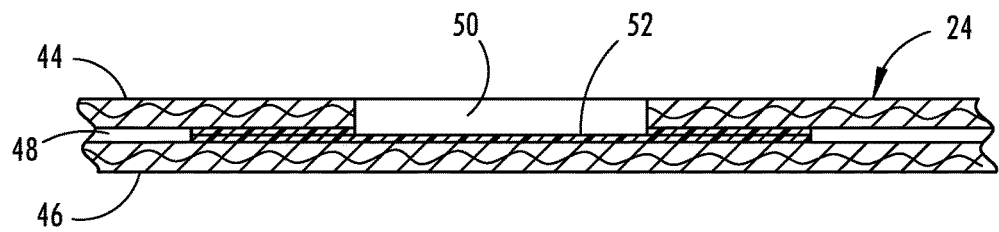
FIG. 3A is a cross-sectional view taken through line IIIA-IIIA of FIG. 3 further illustrating the sealing flap.

Referring to FIGS. 3 and 3A, the seat belt webbing 24 is further illustrated having one of the pressure controlled valves, each in the form of a flap valve 52 disposed over a valve opening 50. The flap valve 52 is shown when little or no air pressure is applied to the interior air passage 38 of the seat belt webbing 24. The tubular seat belt webbing 24 is shown in a somewhat collapsed or flattened state having a top layer 44 and a bottom layer 46 with a small opening in the passageway 38 therebetween. The seat belt webbing 24 may be formed of a material that prevents air from flowing through the material or substantially prevents air from flowing through the material. One example of a material suitable for forming the seat belt webbing 24 is a woven polyester which may be coated with a silicone layer to achieve a desired low level or no air permeability. A plurality of valve openings 50 are formed in a surface of the seat belt webbing 24 to allow air delivered in the passageway 38 to exit the seat belt webbing 24 when the valve openings 50 are not sealed closed by the flap valves 52 to deliver air for heating, cooling, or scented related delivery to the passenger seated in the seat. A flap valve 52 is positioned proximate to each valve opening 50 so as to control the flow of air through the valve opening 50. As seen in FIG. 3A, when forced air is not delivered to the passageway 48, the seat flap valve 52 which is normally biased to the open position is sandwiched between the deflated top and bottom layers 44 and 46 of the seat belt webbing 24.

Figure 4:
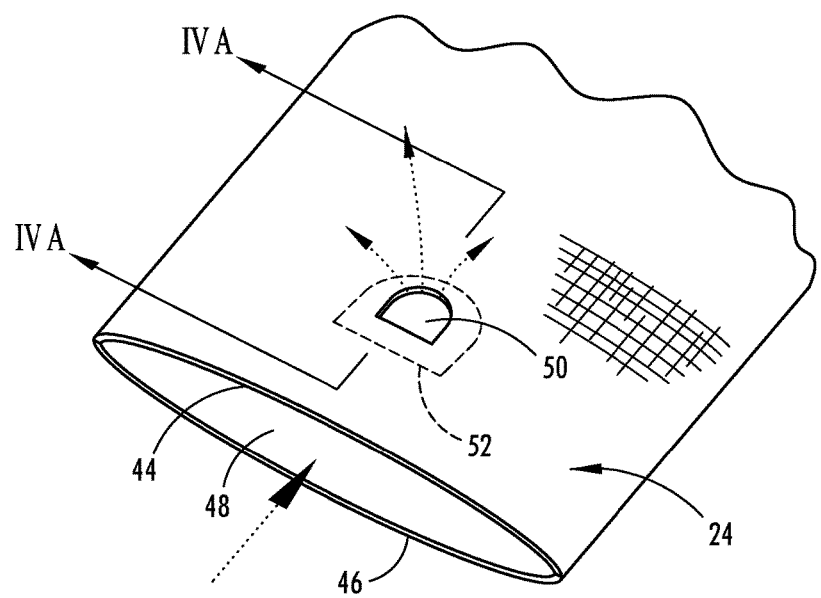
FIG. 4 is an enlarged portion of the seat belt webbing further illustrating the sealing flap in an open valve position when air is delivered at a first pressure.
Figure 4A:
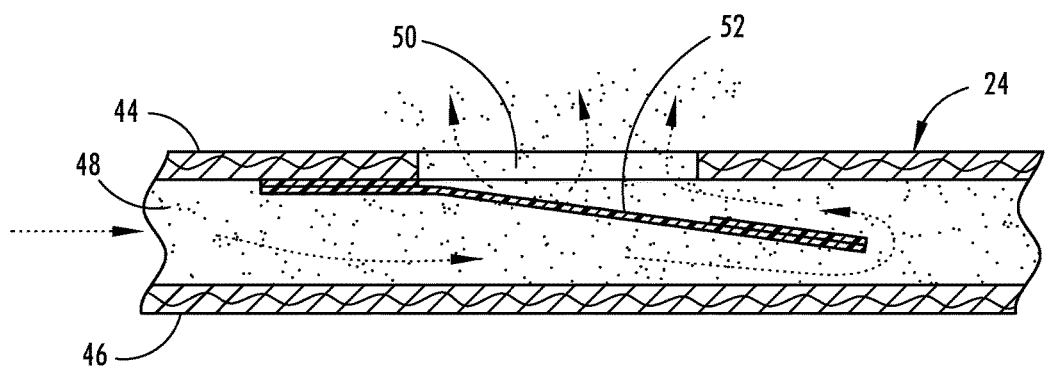
FIG. 4A is a cross-sectional view taken through line IVA-IVA of FIG. 4 further illustrating the open valve position of the sealing flap.

Referring to FIGS. 4 and 4A, the seat belt webbing 24 is further illustrated when the air delivery system delivers forced air at a first air pressure into passageway 48 to cause the forced air to be delivered through the seat belt webbing 24 and exiting the openings 50. When forced air is delivered at the first pressure within passageway 48, the forced air causes the upper and lower layers 44 and 46 of the seat belt webbing 24 to inflate and separate and partially expand into the tubular shaped passageway 38. The flap valve 52 may be formed of a woven polyester with a silicone coating adhered or otherwise connected at one end to the inside surface of the webbing 24 with stitching and has a normally biased open position with spring-like properties that maintain the valve 52 in the open position at the first lower pressure. The normally open biased position could be achieved with a spring-like living hinge, according to one embodiment. This allows forced air delivered at the first pressure within passageway 48 to exit each opening 50 as seen in FIG. 4A.

Figure 5:
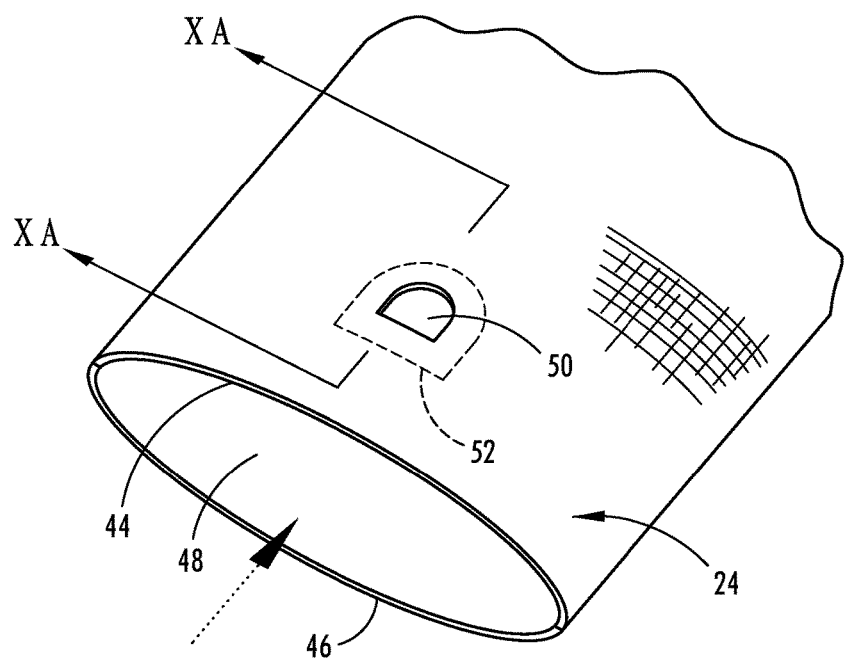
FIG. 5 is an enlarged view of a portion of the seat belt webbing illustrating the sealing flap in a closed valve position at a higher second pressure.
Figure 5A:
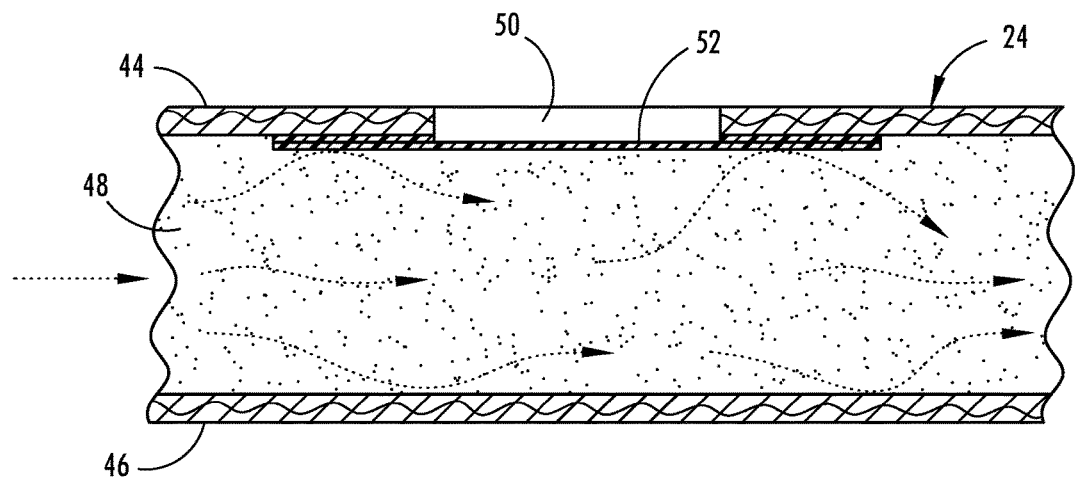
FIG. 5A is a cross-sectional view taken through line VA-VA of FIG. 5 further illustrating the sealing flap in the closed valve position.

Referring to FIGS. 5 and 5A, the seat belt webbing 24 is further illustrated when a higher second pressure air is introduced into passageway 48 from the air delivery device 40. When the pressure of the forced air exceeds a pressure limit of the biased open flap valve 52, the flap valve 52 is forced to a closed position to seal against the inside surface of the seat belt webbing 24 to form a seal to close off the opening 52 and prevent air from flowing out of the opening 50. The seal may be formed by overlapping rubber portions sealingly engaging one another to seal closed the opening. When this occurs, the seat belt webbing 24 continues to expand in volume within passageway 48 so as to expand the size of the seat belt 24 and form an expanded tubular-shaped seat belt for comfort purposes. Accordingly, a user may select an enhanced comfort seat belt that has an expanded size by introducing a higher pressure air to the seat belt webbing 24. When this occurs, air delivery through the openings 50 of the seat belt 24 ceases to exist.

Figure 6:
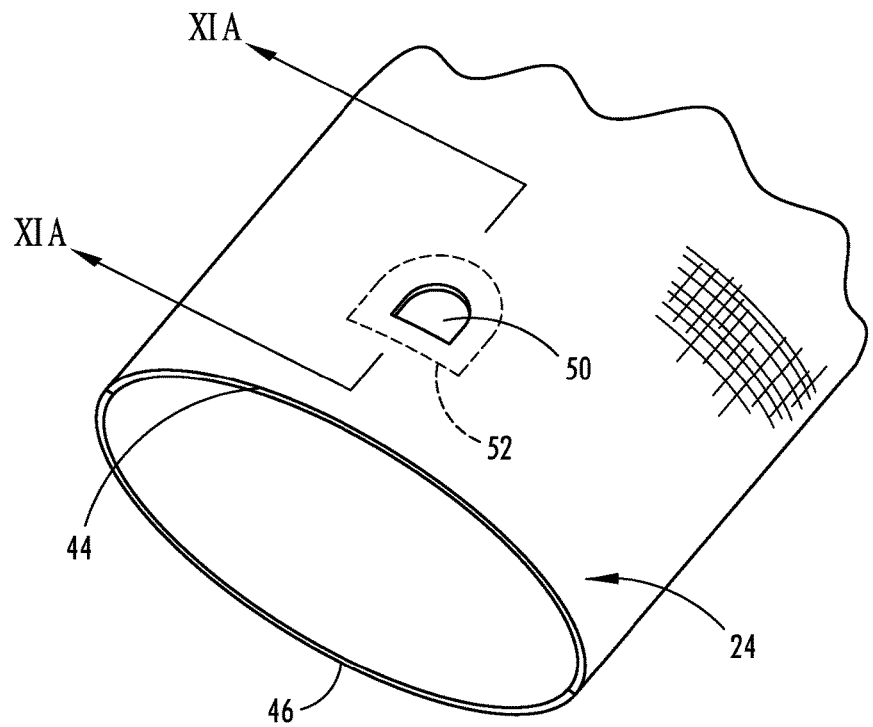
FIG. 6 is an enlarged view of a portion of the seat belt webbing illustrating use of the webbing with an airbag, according to another embodiment.
Figure 6A:
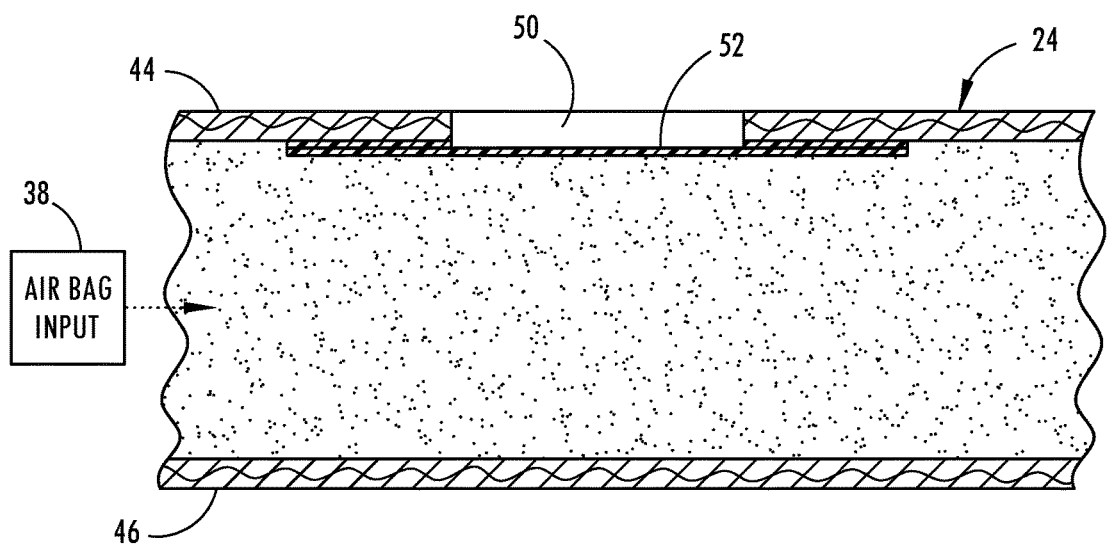
FIG. 6A is a cross-sectional view taken through line VIA-VIA of FIG. 6 further illustrating airbag inflation of the webbing.

Referring to FIGS. 6 and 6A, the seat belt webbing is further illustrated having an input applied by an optional airbag 38 located within passageway 48 of the seat belt webbing 24, according to another embodiment. It should be appreciated that the seat belt system 20 may incorporate or use the seat belt webbing 24 as an airbag, according to one embodiment and may provide air delivery via openings 50 as described above. The airbag configuration provided by the seat belt webbing 24 has the webbing 24 coupled to an airbag gas supply 38 which, when deployed, causes an airbag gas at a third higher pressure to be injected into the seat belt webbing 24 so as to further expand the size of the seat belt webbing 24 for restraint purposes. When this occurs, the flap valves 52 are forced by force of the high pressure gas to the closed valve position so as to prevent air or gas from exiting openings 50. It should be appreciated that the vehicle seat belt system 20 may employ a seat belt and air delivery system with or without the airbag provided with the seat belt webbing 24. It should also be appreciated that a separate airbag with a separate gas delivery passageway may be inserted within the seat belt webbing 24, according to another embodiment.

Figure 7:
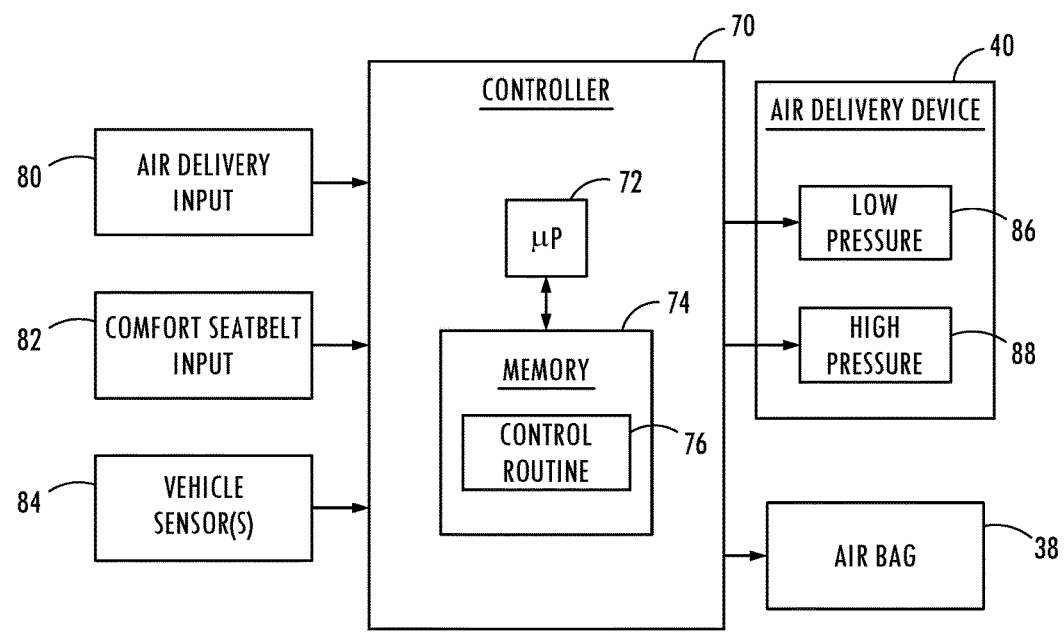
FIG. 7 is a block diagram further illustrating a control system for controlling the air delivery system for delivering air to the seat belt, according to one embodiment.

Referring to FIG. 7, the controls for controlling the seat belt system to achieve different pressure levels within the seat belt webbing 24 is illustrated, according to one embodiment. The system 20 is shown including a controller 70, which may be a dedicated or shared controller, such as an HVAC controller, according to one embodiment. The controller 70 may include a microprocessor 72 and memory 74 which may execute one or more control routines 76. The controller 70 receives various inputs. Included as an input is an air delivery input 80 which may be input by a user or via the HVAC control system to request air delivery via the seat belt webbing. Also included as an input is a comfort seat belt input which may be a user input or a controlled input that adjusts the comfort of the seat belt webbing by applying a second higher pressure to enlarge the size of the seat belt for comfort purposes. Other inputs may include various sensors that input various sensed parameters of the vehicle and passenger including passenger body temperature sensors, heart rate sensors, breathing rate sensors, humidity level sensors, driver drowsiness sensors, collision sensors, and other sensors that may sense the one or more parameters of the vehicle and the passenger. It should be appreciated that by knowing the parameters of the passenger, the air delivery system 20 may deliver desired heated or cooled air, aromatherapy, smelling salt scents, pure oxygen, humidified air or other conditioned air. Collision sensors may be used to detect an anticipated accident and used to deploy the airbag 60. The controller 70 processes the various inputs and may execute one or more control routines 76 to generate outputs for the air delivery device 40 and the airbag 38. When an air delivery input is requested, a low pressure air signal is provided to the air delivery device 40 to generate a low pressure air. When a comfort seat belt input is requested, a second high pressure 88 is applied by the air delivery system 40. When a sufficient vehicle accident is detected, the airbag 38 may be deployed which causes gas at a highest third pressure to be input into the seat belt webbing 24 to expand and operate as an airbag.

Accordingly, the vehicle seat belt system 20 advantageously provides for a plurality of pressure controlled valves and air delivery through the valves at a first pressure and expansion of the seat belt webbing for seat belt comfort at a second air pressure. Further, the vehicle seat belt system 20 advantageously allows air to be delivered through the seat belt buckle into the seat belt webbing. The system 20 therefore advantageously provides for enhanced comfort and thermal control.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat belt system comprising:
   a seat belt comprising a tubular seat belt webbing defining a passageway and a plurality of pressure controlled valves; and
   an air delivery device supplying air to the seat belt, wherein the valves allow the supplied air to exit openings in the seat belt webbing at a first air pressure and block the supplied air from exiting the openings at a second air pressure.

2. The seat belt system of claim 1, wherein the seat belt comprises a shoulder belt, wherein the passageway and the plurality of pressure controlled valves are formed in the shoulder belt.

3. The seat belt system of claim 1 further comprising a buckle for connecting with the seat belt webbing, wherein the supplied air from the air delivery device enters the webbing through the buckle.

4. The seat belt system of claim 1 further comprising an airbag gas supply operatively coupled to the webbing, wherein the airbag gas supply causes the webbing to expand when activated.

5. The seat belt system of claim 1, wherein the first air pressure is less than the second air pressure.

6. The seat belt system of claim 1, wherein each of the valves comprises an opening and a sealable flap for engaging the opening between an open position that allows the supplied air to flow through the opening and a closed position that blocks the supplied air from flowing.

7. The seat belt system of claim 6, wherein the sealable flap is biased to an open position.

8. A vehicle seat belt system comprising:
a seat belt comprising a tubular seat belt webbing defining a passageway and a plurality of pressure controlled valves;
a seat belt buckle for connecting with the seat belt, wherein the seat belt buckle forms an air delivery passage for delivering air to the passageway; and
an air delivery device coupled to the seat belt buckle for supplying air to the seat belt webbing.

9. The seat belt system of claim 8, wherein the seat belt comprises a shoulder belt, wherein the passageway and the plurality of pressure controlled valves are formed in the shoulder belt.

10. The seat belt system of claim 8 further comprising a tongue connected with the seat belt webbing for releasably connecting with the buckle, wherein the supplied air from the air delivery system enters the passageway in the webbing through the buckle and the tongue.

11. The seat belt system of claim 8 further comprising an airbag gas supply operatively coupled to the webbing, wherein the airbag gas supply causes the webbing to expand when activated.

12. The seat belt system of claim 8, wherein the plurality of pressure controlled valves allow the supplied air to exit the seat belt at a first air pressure and block the supplied air from exiting at a second air pressure.

13. The seat belt system of claim 12, wherein the first air pressure is less than the second air pressure.

14. The seat belt system of claim 12, wherein each of the plurality of pressure controlled valves comprises an opening and a sealable flap for engaging the opening between an open position that allows the supplied air to flow through the opening and a closed position that blocks the supplied air from flowing.

15. The seat belt system of claim 14, wherein the sealable flap is biased to the open position.

16. A vehicle seat belt system comprising:
a seat belt comprising a tubular seat belt webbing defining a passageway and a plurality of pressure controlled valves;
a seat belt buckle and tongue for connecting with the seat belt, wherein the seat belt buckle and tongue form an air delivery port for delivering air to the passageway; and
an air delivery device supplying air to the seat belt webbing, wherein the plurality of valves allow the supplied air to exit openings in the seat bell webbing at a first air pressure and block the supplied air from exiting the openings at a second air pressure.

17. The seat belt system of claim 16 further comprising an airbag gas supply operatively coupled to the webbing, wherein the airbag gas supply causes the webbing to expand when activated.

18. The seat belt system of claim 16, wherein the first air pressure is less than the second air pressure.

19. The seat belt system of claim 16, wherein each of the plurality of the valves comprises a sealable flap for engaging one of the openings between an open position that allows the supplied air to flow through the one of the openings and a closed position that blocks the supplied air from flowing through the one of the openings.

20. The seat belt system of claim 19, wherein the sealable flap is biased to the open position.

* * * * *